(12) United States Patent
Lim

(10) Patent No.: US 8,312,277 B2
(45) Date of Patent: Nov. 13, 2012

(54) METHOD AND SYSTEM FOR SECURE COMMUNICATION BETWEEN COMPUTERS

(75) Inventor: Hoon Wei Lim, Antibes (FR)

(73) Assignee: SAP AG, Walldorf (DE)

( * ) Notice: Subject to any disclaimer, the term of this patent is extended or adjusted under 35 U.S.C. 154(b) by 296 days.

(21) Appl. No.: 12/609,672

(22) Filed: Oct. 30, 2009

(65) Prior Publication Data

US 2010/0332835 A1   Dec. 30, 2010

(30) Foreign Application Priority Data

Jun. 25, 2009 (EP) .................................... 09290497

(51) Int. Cl.
- *H04L 9/32* (2006.01)
- *H04L 9/00* (2006.01)
- *H04L 9/08* (2006.01)
- *H04L 12/66* (2006.01)
- *H04L 12/28* (2006.01)

(52) U.S. Cl. .......... 713/171; 380/44; 380/281; 370/352; 370/401

(58) Field of Classification Search .................... 380/44, 380/281; 713/171; 370/352
See application file for complete search history.

(56) References Cited

U.S. PATENT DOCUMENTS

| | | | |
|---|---|---|---|
| 2002/0118674 A1* | 8/2002 | Faccin et al. | 370/352 |
| 2006/0093138 A1* | 5/2006 | Durand et al. | 380/44 |
| 2006/0274899 A1* | 12/2006 | Zhu et al. | 380/281 |
| 2010/0332835 A1 | 12/2010 | Lim | |

OTHER PUBLICATIONS

Non Final Office Action for U.S. Appl. No. 12/609,672, mailed Dec. 15, 2011, 13 pages.
EESR for EP Application No. 09290497.8, mailed Apr. 27, 2010, 4 pages.

* cited by examiner

*Primary Examiner* — Jeffrey D Popham
*Assistant Examiner* — Evans Desrosiers
(74) *Attorney, Agent, or Firm* — Brake Hughes Bellermann LLP

(57) ABSTRACT

Method, system and computer program for exchanging data between a client computer and a storage device are described, in which the storage device may send a long-term DH-component to an intermediate server. The client computer may send a first short-term DH-component to the storage device through the intermediate server that adds a communication expiration time. The storage device may send a second short-term DH-component to the client computer. The client computer and the storage device may calculate a symmetric key from the long-term component and from both short-term DH-components to exchange data and may delete the short-term DH-components upon reaching the expiration time.

17 Claims, 6 Drawing Sheets

METHOD AND SYSTEM FOR SECURE COMMUNICATION BETWEEN COMPUTERS

CROSS-REFERENCE TO RELATED APPLICATION

This application claims priority under 35 U.S.C. §119 to European Patent Application EP09290497.8, filed Jun. 25, 2009, titled "METHOD AND SYSTEM FOR SECURE COMMUNICATION BETWEEN COMPUTERS," which is incorporated herein by reference in its entirety.

TECHNICAL FIELD

Embodiments relate to computer systems in general, and to data storage systems in particular.

BACKGROUND

Recently, the software industry sees trends to create applications (such as applications for enterprises) with "software-as-a-service" components that are distributed over a network. Looking at the architecture, human users operate computers (client computers) that are connected through the network to data storage devices. Looking at the content, the devices store data, such as application software archives, images, property definitions, configuration data, transaction data, log records and so on. Looking at the technical implementation, the devices are hard-disks or other physical devices that are directly attached to the network. Such a network configuration allows bypassing of auxiliary computers (e.g., storage servers) that otherwise may be required. Within the devices, data is arranged in volumes and files.

High numbers are typical: Enterprises or organizations might have 10,000 or more human users; the number of client computers might exceed the number of users; there might be 100,000 or more storage devices. Data volumes are measured in counters such as terabytes, exabytes, or petabytes. Large files require distribution over multiple physical devices. Scalability matters.

Security of data exchange between the clients and the devices is of paramount importance. For example, it needs to be ensured that data can only be accessed by authorized users. Security has the aspect of using cryptographic techniques to encrypt and decrypt data. However, such techniques cause an inherent cryptographic overhead. For example, clients and devices may need to perform cryptographic computation. Cryptographic techniques typically use symmetric or asymmetric keys, or combinations thereof. In such cases, keys need to be generated, distributed, stored, renewed and eventually revoked.

Security is in conflict with the above mentioned high numbers. Just to take cryptographic keys as an example: key generation is potentially linked to the number of files or volumes, so a large number of files or volumes might require a large number of keys. Further, key distribution is potentially linked to the number of clients and storage devices, so large number of clients or devices might require a large number of keys, as well.

As networks are dynamically changing by clients and devices being added or removed, the cycle from generating keys to revoking keys is being repeated. Some devices might even become compromised or corrupted by intruders, and that also affects the key cycles.

There is an ongoing need for improvement that mitigates some or all of the mentioned disadvantages.

SUMMARY

The details of one or more implementations are set forth in the accompanying drawings and the description below. Other features will be apparent from the description and drawings, and from the claims.

DETAILED DESCRIPTION

Figure 1:
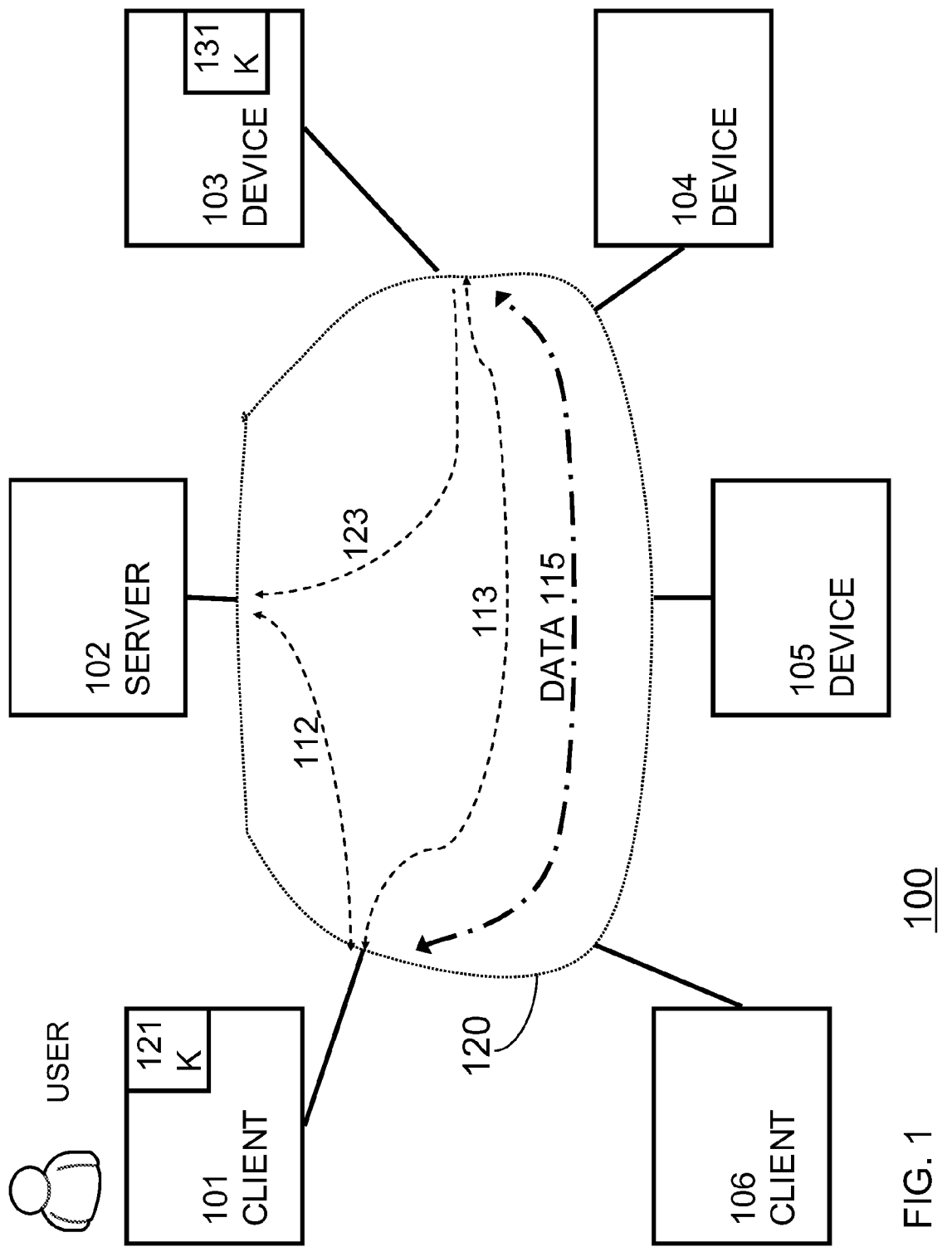
FIG. 1 is a block diagram of an exemplary system with client computers, storage devices, and a server.

FIG. 1 is a block diagram of an exemplary system with client computers, storage devices, and a server.

In the example, system 100 comprises client computer 101, server 102, storage devices 103, 104, 105, and client computer 106. These system elements communicate through network 120 (dotted line).

Network 120 is implemented, for example, by technology that allows communication between computers. At an organizational level, network 120 could be, for example, the network in an organization, or it could be the public internet.

Client computers 101, 106 (hereinafter "clients", abbreviated C) are implemented by general-purpose processors, memory, network adapter and other parts; conveniently the client computers have user interfaces for communicating with human users, the example of FIG. 1 shows a user operating client 101.

Storage devices 103, 104, 105 (hereinafter "devices" abbreviated D) are implemented with hard-disk, flash-memory or similar hardware to store data. In the exemplary embodiment, user interfaces are not provided. The devices have processors or controller and network adapters.

Server 102 (abbreviated S) is implemented by processors, memory, network adapter, etc. but usually optimized to communicate with multiple other computers. Usually, servers are part of the network infrastructure, and for the purpose of the present description, existing servers can be used. Since the server assists in communicating, it also may be referred to as an intermediate server.

The functional distinction into client, server, and devices is convenient for explanation, for example, how a user (operating the client) accesses data on the storage device, but not required. As persons of skill in the art understand, the concepts of the present description relate to communication between computers in general.

In the example, arrows 112, 123 and 113 (dashed lines) illustrate communication in accordance with an example method, that involve client 101, server 102 and device 103 in order to generate a data exchange key K 121/131. Note that arrow 123 indicates unidirectional communication (to server 102). The key K is made available to client 101 and device 103, and symmetric to both. Arrow 115 (dash-point line) illustrates that client 101 and device 103 exchange data that is encrypted and decrypted with key K.

In example embodiments, generating key K can be applied to client 106 and to devices 104, 105 as well. The figure is simplified, in view of the above mentioned high numbers, and in actual implementations there may typically be many more network components.

Figure 2:
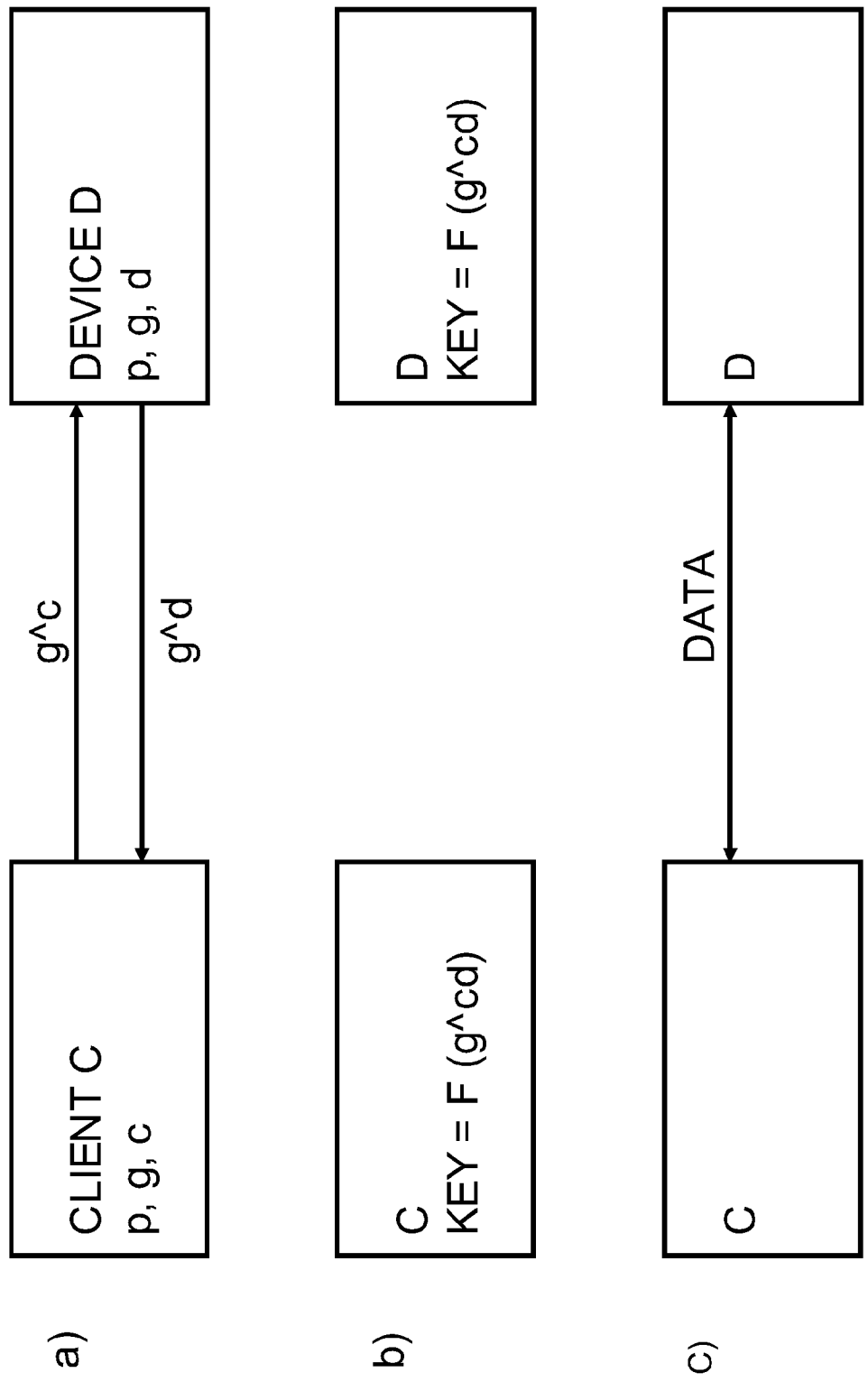
FIG. 2 is a block diagram of a client computer and a storage device, to illustrate the basic concept of generating a symmetric key from Diffie-Hellman components.
Figure 3:
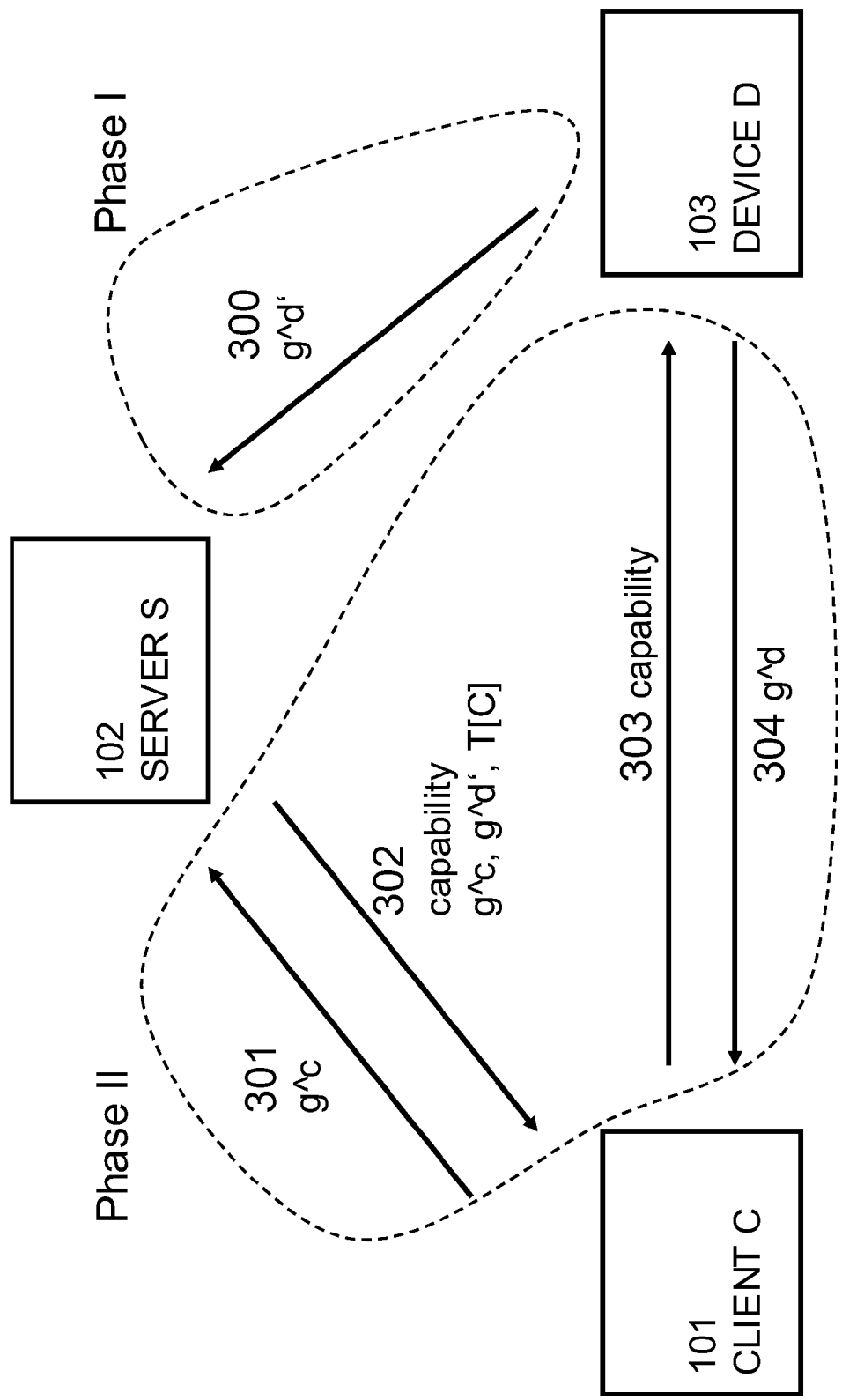
FIG. 3 is a block diagram of a part of the example system of FIG. 1 to illustrate generating a data exchange key as implemented in the example of FIG. 1.
Figure 4:
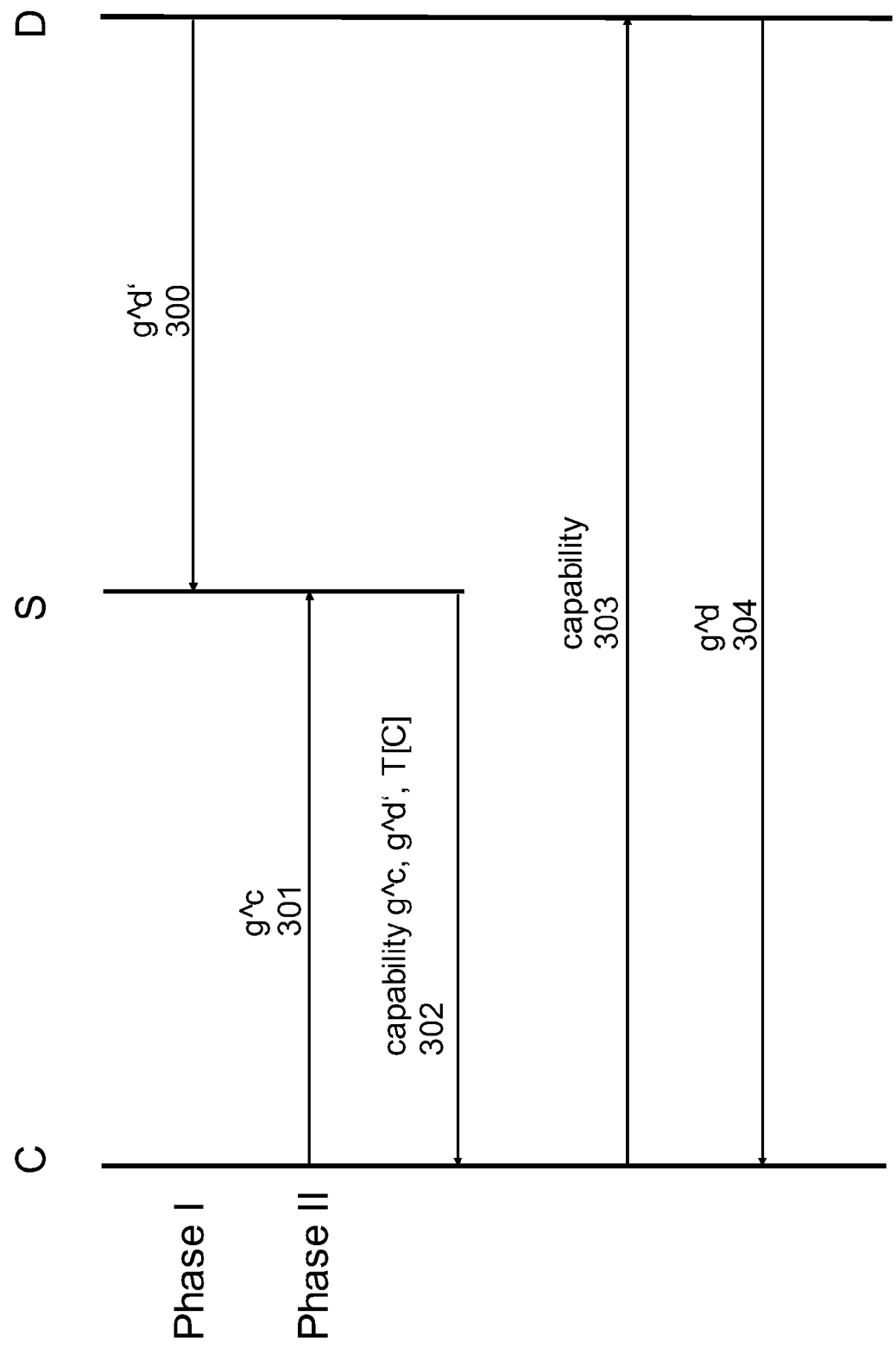
FIG. 4 is a protocol chart diagram to illustrate the generation of the key in consecutive steps.

In the following, details for the example embodiments are explained by looking at two parties (i.e. client, device) generating a key (FIG. 2), and at the parties using an intermediate party (i.e. server) to generate the data exchange key (FIG. 3-4). FIGS. 3-4 concentrates on the general principle, and FIG. 5 adds further details for an embodiment that applies additional authentication techniques.

Further, looking at the timing, phases may be distinguished. In phase I, device 103 is initiated to communicate in the system, for example, when it is added to the system, or upon a configuration reset. The apostrophe ' indicates a component that is generated in phase I, for example, component g^d'. Phase II starts when client 101 requests data access from device 103 (cf. FIG. 3, step 301).

For simplicity of explanation, example embodiments are explained for client 101, server 102, and device 103, but the principles are applicable for any other combination of clients and devices as well.

FIG. 2 is a block diagram of a client computer and a storage device, to illustrate exemplary basic concepts of generating and using a symmetric key from Diffie-Hellman components. The figure is arranged with duplication in top-down order to show steps a), b) and c)

In step a) client C and device D exchange Diffie-Hellman (DH) components g^c, and g^d, wherein the lowercase letters c and d indicate that devices C and D use random numbers to provide the components. g^c is the component coming from C (using random number c) and going to D; g^d is the component coming from D (using random number d) and going to C.

Simplified, DH components are obtained according to the following: C and D share a common prime number p, and a common generator g. There is no need to encrypt these common numbers. C and D each provide random numbers, c and d, respectively. The DH-components g^c and g^d are modulo values derived from c and d under consideration of generator g and prime number p.

As in step b) both C and D calculate a symmetric key KEY, from g^c and g^d. The key generating function F=(g^cd) is well-known in the art.

As in step c) both C and D use the symmetric key to encrypt/decrypt data; in the particular example, C uses the key to encrypt data that it sends to D; and D uses the key to encrypt data that it sends to C.

In the present description, for simplicity of explanation, the ^ symbol replaces superscript notation, and the operation "mod p" is not written here. For example, g^c reads as "calculate g to the power of c to an intermediate value and calculate the modulo p from that intermediate value".

The key can be calculated from the components within a short time, but practically it would take an intruder "eternal time" to calculate the key.

FIG. 3 is a block diagram of a part of the network to illustrate generating a symmetric data exchange key according to example embodiments. For example, an intermediate server (S) may sign a DH-component that is provided by the client C, so that the generation of the key is modified.

Hence, FIG. 3 shows client 101 (C), server 102 (S) and device 103 (D); for convenience the network is not shown. For the sake of example, it may be assumed that the common prime number p and common generator g are distributed to client C, device D, and server S. In the example, also assume that client C needs to access data that is stored on device D. Also, C and S are already mutually authenticated.

In phase I, device 103 (D) is initiated to the system, and the actions start with pre-distributing a component that is provided by D. As shown by arrow 300 from D to S, device D sends component g^d' to S. Note the ' symbol standing for this initiating phase I. g^d' is a "long-term" DH-component that is also valid in phase II. It should be noted here that in that phase I, the client C is potentially not yet available in the network.

In phase II, starting when client C requests data access (to D), there are more actions, shown by arrows 301-304. In phase II, DH-components and keys are provided that are "short-term" components to be deleted upon reaching the end of an expiration time T[C]. T[C] can be a set as a time point (when validity expires) or time duration (during that a component or key is valid, like a "life-time"). Phase II is the communication phase, during which client C and devices D exchange data.

Phase II is usually repeated for subsequent communication sessions, while the DH-component of phase I (g^d') remains unchanged.

As shown by arrow 301 from C to S, client C sends its component g^c to server S, as part of a request to open a file on device D.

As shown by arrow 302 from S to C, server S sends a signed g^c and the "long-term" g^d' to client C in combination with the expiration time (T[C]). The combination of g^c, g^d' and T[C] is referred herein to as a "capability indicator".

As shown by arrow 303, the client C sends the capability indicator to device D.

As shown by arrow 304, the device D sends g^d to C. Note that g^d (of phase II) is different from g^d' (of phase I).

Now, both the client C and the device D have g^c, g^d and g^d' and can calculate the symmetric key K[CD]; or do not calculate this key if T[C] has been reached.

FIG. 4 is a protocol chart diagram to illustrate the generation of the key in consecutive steps. Vertical lines stand for client C, server S and device D. Arrow 300 indicates the action in phase I; arrows 301-304 indicate the actions in phase II.

As mentioned, the explanation of FIGS. 3-4 assumed that client and server have already been authenticated. As person of skill in the art understand there are different ways to authenticate two computers. In an example embodiment(s), authentication may be combined with the method steps described herein, or similar method steps.

Figure 5:
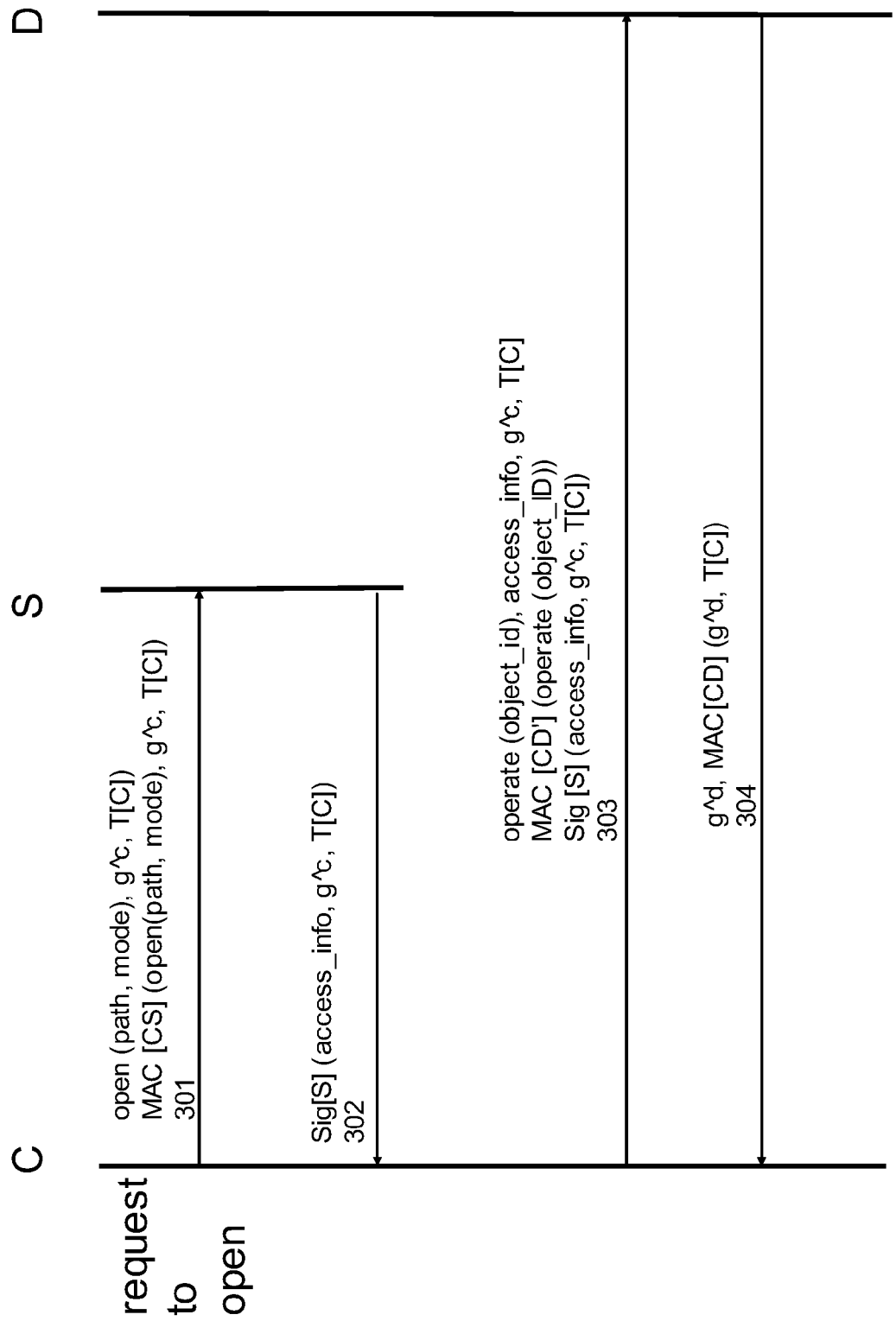
FIG. 5 is a protocol chart diagram to illustrate the generation of the key in consecutive steps, that involves authentication.

FIG. 5 is a protocol chart diagram to illustrate the generation of the key in consecutive steps that involves authentication. The notation continues to use C for client, S for server, D for device when referring to computers; lower case letters for numbers (c, d random, g generator). Arrows 301-304 refer to similar steps as in FIGS. 3-4. FIG. 5 concentrates on phase II.

Arrow 301, from client C to server S indicates that client C that is being operated by the user (cf. FIG. 1, client 101) and server S authenticate each other and establish a client-server session key K[CS] using a well-known username/password and TLS (Transport Layer Security)/SSL (Secure Socket Layer) handshake method. (TLS/SSL protocols are widely used in web-based applications to establish secure connections.) In order to access data stored on device D, the client C first obtains the (above-mentioned) capability from the server S. As in step 301 (cf. FIG. 3), the client submits a request to server S as: open (path, mode), g^c, T[C], in which "path" specifies the namespace of the file to be opened, "mode"

specifies read, write or read/write access mode, with $g\hat{}c$ being the DH-component (c random), and with T[C] the expiration time.

To protect the integrity of the request, $g\hat{}c$, and T[C], client and server use a message authentication code (MAC), such as: MAC [CS] (open(path, mode), $g\hat{}c$, T[C]) produced by a secret key K from S, i.e. the K[CS] key.

Arrow 302, from server S to client C, indicates that the server (having received T[C]) checks for validity in view of T[C], and whether the client C is permitted to access the file. If that is the case, the server S generates the mentioned capability (cf. step 302, for sending to the client) as a signature, e.g., Sig [S] (access_info, $g\hat{}c$, T[C])

The signature uses the private key of S key of an asymmetric key pair. "Access_info" stands for the DH-component $g\hat{}d'$ (cf. FIG. 3, step 300 that the device D has previously sent to the server). "Access_info" can also include other details such as, e.g., the identity of client C, a file handle (which lists objects or physical blocks that compose the file on the device D), file identifiers, access mode and so on. The server S sends this capability to the client C.

Arrow 303, from client C to device D, indicates that the client extracts $g\hat{}d'$ from the capability (from "access_info") and calculates the temporary key as K [CD']=F (C, D, $g\hat{}cd'$, T[C]), with F being a secure key derivation function. The temporary key is symmetric. This derivation function can be based on, for example, a pseudorandom permutation or keyed one-way function as is known in the art.

The client may then use the capability to prove its authorization to access the specified file. The client may then issue an I/O (input/output) operation request to the device D, cf. step 303 operate (object_id), access_info, $g\hat{}c$, T[C]
        MAC [CD'] (operate (object_ID))
            Sig [S] (access_info, $g\hat{}c$, T[C])

with "object_id" identifying the objects to be accessed on the device, such as the particular file; MAC[CD'] representing an authentication code calculated by the client from K [CD'] to authenticate itself to the device D; and Sig [S] being the signature from the server S.

Arrow 304, from device D to client C indicates that the device may verify the request and provide a further DH-component $g\hat{}d$ (cf. step 304). The session key for exchanging data (i.e., data exchange key) between client C and device D is calculated to be K [CD]=F (C, D, $g\hat{}cd'$, $g\hat{}cd$, T[C])

Having exchanged the components, client and device can then exchange data by encrypting and decrypting, as illustrated above in FIG. 1 (arrow 115).

Figure 6:
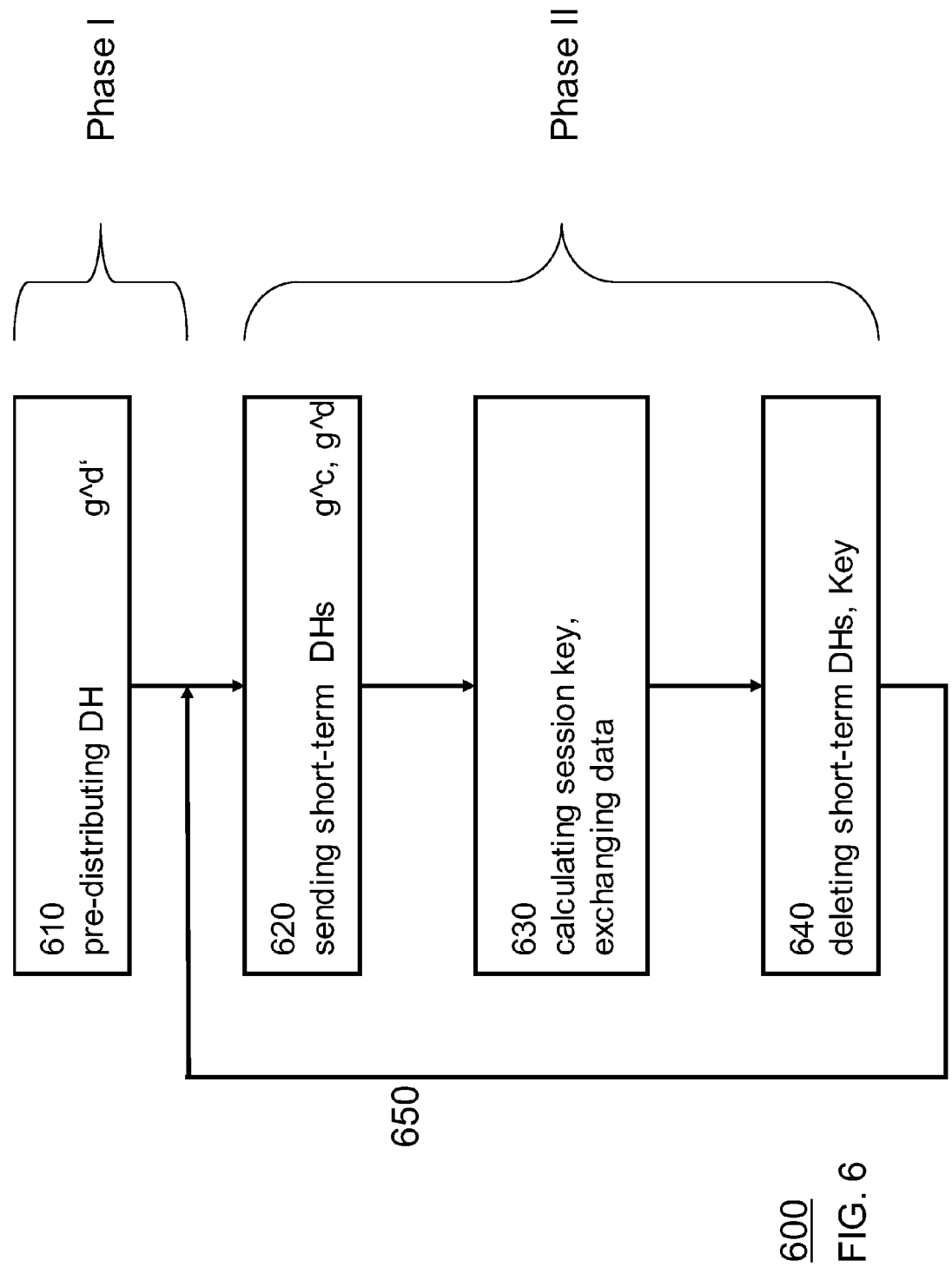
FIG. 6 is a flow chart diagram of an example method that may be used in conjunction with the system of FIG. 1.

FIG. 6 is a flow chart diagram of an example method. Specifically, the example method 600 for exchanging data between a client C and device D comprises, e.g., the following operations.

The operations may include, e.g., phase I with pre-distributing 610 a device specific DH-component to the server (cf., arrow 300 in FIG. 3-4, device D sending a long-term DH-component ($g\hat{}d'$) to the server). The operations also may include, e.g., phase II with sending 620 short-term DH-components (cf. arrows 301, 302, 303, the client C sending $g\hat{}c$ to device D through server S that adds a communication expiration time (T[C]), and arrow 304 the device D sending short-term DH-component $g\hat{}d$ to client);

The operations may include phase II in continuation with client C and device D calculating 630 a symmetric session key (from long-term $g\hat{}d'$ and short-term $g\hat{}c$, $g\hat{}d$ DH-components and actually exchanging data). The operations also may include phase II at the end by deleting 640 the short-term DH-components upon reaching the expiration time (T[C]), and deleting the session key.

As indicated by line 650, phase II is optionally repeated for subsequent client-device communication sessions.

Described implementations thus may include, e.g., a method for exchanging data between client computer (C, 101) and storage device (D, 103), wherein the client and the device encrypt/decrypt the data with a symmetric key that is calculated from mutually exchanged DH-components. In example embodiments, before the client initiates communication, the device may send a long-term DH-component ($g\hat{}d'$) to an intermediate server (S, 102). When the client initiates communication, the client sends a first short-term DH-component ($g\hat{}c$) to the device via the server, the server adds a communication expiration time T[C], and device (D) sends a second short-term DH-component ($g\hat{}d$) to client. Client and device then calculate the symmetric key from the long-term and from both short-term DH-components and delete the short-term DH-components when the expiration time is reached.

The techniques described herein also may be applied to multiple storage devices (cf. 103, 104, 105 in FIG. 1). In such an embodiment, different DH-components are sent by the devices so that the symmetric keys are calculated differently for each device.

Phase I can be initiated as early as when a device is being added to the system; in other words, the system can be configured such that the device sends the long-term DH-component to the server, even if a client has not yet requested access.

Example embodiments may be configured such that the long-term DH-components remain valid even after the short-term DH-components have expired.

As explained in connection with FIG. 5, authentication can be performed simultaneously with performing the methods described herein, and related methods, so that upon communicating DH-components, client and device also exchange information to authenticate each other.

Example embodiments offer a method that involves creating a session key that is symmetric. It does not, however, exclude the option that, for example, for authentication purposes, asymmetric keys may be used. In such cases, the asymmetric keys are already available in the system so that no extra efforts are required. For example, the server upon adding the expiration time to the first DH-component ($g\hat{}c$) (cf. the capability) creates an authentication signature (Sig[S]) that can comprise an asymmetric key. In this setting, the asymmetric key is the private key of the server.

Example embodiments do not require investing in an additional server; existing server hardware can be used. In such embodiments, client, device and server are part of a system of computers that communicate through a network, and in that the functions of the server are performed by computers that provide the network. Such servers are also used to handle meta data in the network (such as, for example, device identification, and/or authentication information).

As referenced above, keys generally may need to be generated, distributed, stored, renewed and/or eventually revoked. The techniques described herein may be used to link key generation and distribution. Moreover, due to the limited life-time of 2 of 3 components, storing and renewing may be simplified.

Storing the long-term DH-components on the server (and not on the devices) is beneficial for security because servers are usually better protected against intruders then devices. Deleting the short-time components (to cause them to be ephemeral) after the client-device session (phase II) supports forward secrecy to keep previously protected data under lock.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for exchanging data between a client computer and a storage device, the method comprising:
    the storage device sending a long-term Diffie-Hellman (DH) component to an intermediate server;
    the client computer sending a first short-term DH-component to the intermediate server and receiving a capability indicator from the intermediate server, the capability indicator including the long-term DH component and the first short-term DH-component with a communication expiration time added by the intermediate server;
    the client computer sending the capability indicator to the storage device;
    the storage device sending a second short-term DH-component to the client computer in response to receiving the capability indicator;
    the client computer and the storage device calculating a symmetric key from the long-term DH component and from both the first and second short-term DH-components to exchange data; and
    deleting the first and second short-term DH-components upon reaching the expiration time.

2. The method of claim 1, applied to multiple storage devices that send different DH-components so that symmetric keys are calculated differently for each device.

3. The method of claim 1, being applied in a system, wherein the storage device sends the long-term DH-component to the intermediate server when the storage device is being added to the system.

4. The method of claim 1, wherein the long-term DH-component remains valid after the first and second short-term DH-components have expired.

5. The method of claim 1, wherein upon communicating DH-components, the client and the storage device also exchange information to authenticate each other.

6. The method of claim 1, wherein the intermediate server upon adding the expiration time to the first DH-component, creates an authentication signature based on the long-term DH component, the first short-term DH-component, and the communication expiration time, the authentication signature including an asymmetric key.

7. The method of claim 6, wherein the asymmetric key is the private key of the intermediate server.

8. The method of claim 1, wherein the client computer, the storage device and the intermediate server are part of a system of computers that communicate through a network and wherein the functions of the intermediate server are performed by at least one computer that provide the network.

9. The method of claim 8, wherein the intermediate server is a server configured to handle meta data in the network.

10. A data exchange system, comprising:
    a storage device configured to send a long-term Diffie-Hellman (DH) component to an intermediate server;
    a client computer configured to send a first short-term DH-component to the intermediate server; and the intermediate server configured to add a communication expiration time to the first short-term DH-component, wherein the client computer is configured to receive a capability indicator from the intermediate server, the capability indicator including the long-term DH component and the first short-term DH-component with the communication expiration time, wherein the client computer is configured to send the capability indicator to the storage device, wherein the storage device is adapted to send a second short-term DH-component to the client computer in response to receiving the capability indicator, wherein the client computer and the storage device are adapted to calculate a symmetric key from the long-term DH component and from both the first and second short-term DH-components to exchange data; and wherein the client computer and the storage device are adapted to delete the first and second short-term DH-components upon reaching the expiration time.

11. A computer program being tangibly embodied on a non-transitory computer-readable medium and being configured to cause, in a data processing system:

a storage device to send a long-term Diffie-Hellman (DH) component to an intermediate server;

a client computer to send a first short-term DH-component to the intermediate server;

the client computer to receive a capability indicator from the intermediate server, the capability indicator including the long-term DH component and the first short-term DH-component with a communication expiration time added by the intermediate server;

the client computer to send the capability indicator to the storage device;

the storage device to send a second short-term DH-component to the client computer in respond to receiving the capability indicator;

the client computer and the storage device to calculate a symmetric key from the long-term DH component and from both the first and second short-term DH-components to exchange data, and to delete the first and second short-term DH-components upon reaching the expiration time.

12. The computer program of claim 11, configured to cause the storage device to send the long-term DH-component to the intermediate server when the storage device is being added to the system.

13. A method for exchanging data, the method comprising:

sending a long-term Diffie-Hellman (DH) component from a storage device to an intermediate server;

receiving, at the storage device, a capability indicator from a client computer, the capability indicator including a first short-term DH-component with a communication expiration time added by the intermediate server and the long-term DH component;

sending, at the storage device, a second short-term DH-component to the client computer in response to receiving the capability indicator;

calculating, at the storage device, a symmetric key from the long-term DH component and from both the first and second short-term DH-components, to exchange data therewith; and deleting the first and second short-term DH-components at the storage device upon reaching the expiration time.

14. The method of claim 13, being applied in a system, comprising sending the long-term DH-component to the intermediate server when the storage device is being added to the system.

15. A computer program being tangibly embodied on a non-transitory computer-readable medium and being configured to cause a client computer to:

send a first short-term Diffie-Hellman (DH) component to an intermediate server;

receive a capability indicator from the intermediate server, the capability indicator including the first short-term DH-component with a communication expiration time added by the intermediate server and a long-term DH component associated with a storage device;

send the capability indicator to the storage device;

receive a second short-term DH-component from the storage device;

calculate a symmetric key to exchange data with the storage device, using both the first and second short-term DH-components and the long-term DH component; and delete the first and second short-term DH-components upon reaching the expiration time.

16. The computer program product of claim 15, wherein the long-term DH-component remains valid after the first and second short-term DH-components have expired.

17. The computer program product of claim 15, wherein upon communicating DH-components, the client also exchange information to authenticate itself with respect to the storage device.

* * * * *